United States Patent

Hosaka

[11] Patent Number: 5,978,034
[45] Date of Patent: Nov. 2, 1999

[54] MOVING PICTURE ENCODING METHOD AND APPARATUS, MOVING PICTURE DECODING METHOD AND APPARATUS AND RECORDING MEDIUM

[75] Inventor: Kazuhisa Hosaka, Tokyo, Japan

[73] Assignee: Sony Corporation, Tokyo, Japan

[21] Appl. No.: 09/025,413

[22] Filed: Feb. 18, 1998

[30] Foreign Application Priority Data

Feb. 20, 1997 [JP] Japan .................................... 9-036764

[51] Int. Cl.⁶ .................................................... H04N 7/32
[52] U.S. Cl. ........................ 348/416; 348/402; 348/407; 348/413; 348/699; 382/243
[58] Field of Search .................... 348/402, 407, 348/413, 416, 699, 700, 431; 382/243, 236, 238; 286/111; H04N 7/30, 7/32

[56] References Cited

U.S. PATENT DOCUMENTS

| | | | |
|---|---|---|---|
| 5,295,201 | 3/1994 | Yokohama | 348/416 |
| 5,608,458 | 3/1997 | Chen et al. | 348/413 |
| 5,612,744 | 3/1997 | Lee et al. | 348/416 |
| 5,790,196 | 8/1998 | Sun et al. | 348/419 |
| 5,883,673 | 3/1999 | Miyamoto | 348/416 |

*Primary Examiner*—Vu Le
*Attorney, Agent, or Firm*—Frommer Lawrence & Haug, LLP.; William S. Frommer

[57] ABSTRACT

A picture encoding method in which a picture constituting a motion vector is divided into an object picture in which the main concern is a picture making up the moving picture and the other picture, the object picture is further divided into a texture picture representing brightness and color hue of the picture and a shape picture representing the shape of an object and the texture and shape pictures are respectively encoded. The motion vector of the shape picture is detected to output the motion vector of the shape picture, and the shape picture is encoded based on the motion vector of the shape picture to output encoded data of the shape picture. The motion vector of the shape picture is encoded to output encoded data of the motion vector of the shape picture, and the motion vector of the texture picture is decoded, using the motion vector of the shape picture, to output the motion vector of the texture picture. The texture picture is encoded based on the motion vector of the texture picture to output encoded data of the texture picture and the motion vector of the texture picture is encoded using the motion vector of the shape picture to output encoded data of the motion vector of the texture picture. This improves the encoding efficiency while facilitating decoding control.

16 Claims, 12 Drawing Sheets

MOVING PICTURE ENCODING METHOD AND APPARATUS, MOVING PICTURE DECODING METHOD AND APPARATUS AND RECORDING MEDIUM

BACKGROUND OF THE INVENTION

1. Field of the invention

This invention relates to a digital moving picture encoding method and apparatus, a moving picture decoding method and apparatus and a recording medium, presupposed on transmission of moving picture signals by a transmission apparatus having variable transmission rates, such as analog or digital telephone networks or dedicated data transmission networks and recording on storage mediums having variable recording capacities, such as optical/magnetic discs or random access memories (RAMs).

2. Description of the Related Art

Among picture encoding systems, there is an encoding technique termed an object scalable encoding system. This encoding system divides a picture into groups termed objects and performs encoding from one object to another.

For example, in object-scalable encoding of a picture V1 made up of a human being and the background, the picture V1 is divided into an object representing the human being and an object representing the background. A picture V2 constituting an object representing a human being and a picture V3 constituting an object representing the background are encoded independently. This enables control such as to finely quantize the picture of the object V2 of the human being and to coarsely quantize the picture V3 of the object of the background and control of encoding all frames of the object V2 of the human being and encoding the picture V3 of the object of the background at a rate of one to a number of frames. This encoding technique has the advantage that the subjective picture quality can be improved for the same amount of generated codes or that the amount of generated codes can be decreased for the same subjective picture quality.

For realizing this object scalable encoding, it is necessary to encode the shape of an object other than the usually encoded texture image (or simply the texture) representing the brightness and color tone of the picture. The object shape is termed the shape picture or simply the shape. It is also occasionally termed key signals. In the example of FIG. 1, the picture V2 of the object of the human being is divided into a texture picture V2a and a shape picture V2b, these pictures V2a and V2b being encoded independently.

The signals representing the shape are classed into hard key signals and soft key signals. The hard key signals are bi-valued pictures representing the inside or the outside of the picture. If a pixel is indicated as being the inside of the object, the texture of the object is used as an output picture. If a pixel is indicated as being the outside of the object, the texture of the background is used as an output picture. The soft key signal is a multi-valued picture representing the ratio of synthesizing the texture inside the object and that outside the object. In a pixel the value of the soft key signal of which is maximum, the pixel value of the texture of the object is directly used as an output picture, whereas, in a pixel the value of the soft key signal of which is minimum, the pixel value of the texture of the background is directly used as an output picture. If the pixel is of an intermediate value, the pixel values of both textures are synthesized, depending on the pixel value, and the resulting synthesized pixel value is used as an output picture.

On the other hand, in a system for transmitting or storing moving picture signals, the picture signals may be compression-coded by exploiting the intra-frame or inter-frame correlation of the moving picture signals for enabling efficient utilization of the transmission channel or the storage medium. Among the techniques of compression-coding the moving picture signals, there is an encoding system standardized by the research organization for encoding the moving pictures, termed MPEG (Moving Picture Image Coding Experts Group).

As the encoding method for picture signals exploiting the above-mentioned intra-frame correlation, orthogonal transform concentrating the coefficients for encoding is frequently used as far as the texture is concerned, while a method based on the so-called MMR (modified modified read) or a method based on JBIG (Joint Bi-level Image Coding Experts Group) is conceived as far as the shape is concerned.

As a method utilizing the above-mentioned inter-frame correlation, motion compensated inter-frame prediction is frequently used. The principle of this motion compensated inter-frame prediction is now explained with reference to FIG. 2.

It is assumed that pictures P1 and P2 have been generated at time points t1 and t2, the picture P1 is already sent and the picture P2 is being newly sent, as shown in FIG. 2. At this time, the picture P2 is divided into plural blocks for each of which the amount of motion (motion vector) between it and the picture P1 is detected. The picture P1 is moved in translation in an amount equal to the motion vector to give a prediction picture for the block, and a difference between the prediction picture and the block of the picture P2 is found. The difference picture and the motion vector are encoded by way of the above-mentioned motion compensated inter-frame prediction.

Since the motion compensated inter-frame prediction is effective both for encoding the texture and for encoding the shape, the motion compensated inter-frame prediction is used in the object scalable encoding for these two. Since the motion vector of the texture is correlated with that of the shape, it is practised to use the motion vector for the texture for predicting the motion vector of the shape.

FIG. 3 shows an illustrative structure of an encoding device for the shape moving picture and the texture motion vector exploiting the above-mentioned motion compensated inter-frame prediction and the motion vector prediction, while FIG. 4 shows the structure of a decoding device which is a counterpart of the encoding device.

The moving picture encoding device shown in FIG. 3 encodes the shape moving picture entering a shape input terminal 101 and a texture motion vector entering a texture input terminal 108 to output the resulting encoded signals at a code output terminal 112.

The texture entering the texture input terminal 108 is sent to a texture motion detector 109 and to a texture encoder 111. The texture motion detector 109 detects the amount of motion between the input texture and the locally decoded texture picture locally decoded by the texture encoder 111 as later explained to output the texture motion vector on the block basis. In detecting the texture motion vector, a locally decoded shape picture as later explained is used. That is, since the texture motion vector is detected on the block basis, the locally decoded shape picture is used to omit the detecting operation of the background portion if the block contains an edge between the human being and the background.

The texture motion vector detected by the texture motion detector 109 is sent to a texture motion compensation unit 110 and to the texture motion vector encoder 106 for texture encoding, while also being sent to a shape motion detector 102 and to a shape motion vector encoder 105 for shape encoding. The texture motion compensation unit 110 creates a prediction texture picture from the locally decoded picture, using the texture motion vector, and enters the picture to the texture encoder 111. The texture encoder 111 encodes the input texture on the block basis. The texture motion vector encoder 106 calculates the difference between the texture motion vector and the texture motion vector of a previously encoded block to encode the resulting difference texture motion vector.

The shape entered from the shape input terminal 101 is sent to the shape motion detector 102 and to a shape encoder 104 as later explained. The shape motion detector 102 detects the amount of motion between the input shape and the locally decoded shape picture locally decoded by the shape decoder 104, on the block basis. In detecting this shape motion vector, reference is had to the texture motion vector in order to find the motion vector having a lesser difference from the texture motion vector so as not to increase the amount of generated bits at the time of encoding the shape motion vector as later explained. The detected shape motion vector is entered to a shape motion compensation unit 103 and to the shape motion vector encoder 105 for shape encoding. The shape motion vector encoder 105 calculates a difference between the shape motion vector and the texture motion vector of the previously encoded block to encode the difference shape motion vector. The shape motion compensation unit 103 generates a prediction shape picture from the locally decoded shape picture, using the shape motion vector, to enter the produced prediction shape picture in the shape encoder 104. The shape decoder 104 encodes the input shape, based on the prediction shape picture, from one block to another.

Output signals of the shape decoder 104, shape motion vector encoder 105, texture motion vector encoder 106 and the texture encoder 111 are multiplexed by a multiplexer 107 so as to be outputted as encoded data at a code output terminal 112. This encoded data is transmitted over a communication network to a receiving side, or recorded on a recording medium for later reproduction by a reproducing device.

The encoding method for the shape motion vector and the texture motion vector is summarized. The texture motion vector is encoded as a difference from the texture motion vector of the previously detected block (difference texture motion vector). The shape motion vector is encoded as a difference from the texture motion vector of the previously encoded block, that is the directly previous block (difference shape motion vector).

For texture encoding, the locally decoded shape picture must be previously found. The texture encoder 111 encodes the texture on the block basis. If this block contains an edge between the human being and the background, and the texture within the block is encoded in this state, high frequency components are produced to disable efficient data encoding. Thus, if a block contains an edge, the processing of substituting pixels of the background portion for the pixels of an edge portion with the human being is performed by exploiting the locally decoded shape picture.

The time flow of encoding of the above-mentioned shape motion vector and texture motion vector is as shown in FIG. 5. The processing of FIG. 5 is iteration from block to block. The following processing is carried out for each block.

First, at step ST101, one of the previously encoded texture motion vectors (usually, the texture motion vector lying on the left or upper side of the block being encoded) is selected, and a difference shape motion vector between the texture motion vector and the shape motion vector of the block being encoded is calculated and encoded.

Then, at step ST102, the shape is encoded, using the shape motion vector, and the resulting encoded shape is locally decoded to find the locally decoded shape picture. Then, at step ST103, the texture motion vector is found using the locally decoded shape picture. As for the texture motion vector, a difference between the texture motion vector of the block for encoding and the previously encoded texture motion vector is calculated and encoded.

Then, at step ST104, the texture is encoded, using the texture motion vector, and the resulting encoded texture is locally decoded to find the locally decoded picture. Finally, at step ST106, it is judged whether or not the processing for all blocks has come to a close. If the processing has not come to a close, processing reverts to step ST101 to repeat the above processing. If the processing has come to a close, the flow of the flowchart is terminated.

The reciprocal reference between the texture motion vector and the shape motion vector is as shown in FIG. 6, from which it is seen that, in encoding the texture motion vector and the shape motion vector of the blocks B101 to B103, reference is had to the texture motion vector of the previously detected (encoded) other blocks and the differences (residuals) is encoded.

The decoding device for the moving pictures of the shape and the texture, shown in FIG. 4, outputs the shape moving picture, decoded from code data entering a code input terminal 121, at a shape output terminal 127, while outputting the texture moving picture at a texture output terminal 130.

That is, in FIG. 4, the encoded data from a transmission network, received by a receiving device, not shown, or encoded data from a recording medium, reproduced by the reproducing device, are separated by a demultiplexer 122 into codes of the shape, shape motion vector, texture and the texture motion vector.

The separated codes are sent to associated decoders, that is a shape decoder 126, a shape motion vector decoder 123, a texture decoder 129 and to a texture motion vector decoder 124 for decoding. The texture motion vector decoder 124 decodes the input codes to generate a difference texture motion vector. The texture motion vector of the previously decoded block (texture motion vector of a block lying on the left or upper side of the block being decoded) is summed to the difference texture motion vector to decode the texture motion vector. This texture motion vector is entered to a texture motion compensation unit 128 and to a shape motion vector decoder 123.

The shape motion vector decoder 123 decodes the input code to generate the difference shape motion vector. The texture motion vector of the previously decoded block (texture motion vector of a block lying on the left or upper side of the block being decoded) is summed to the difference shape motion vector to decode the shape motion vector. This shape motion vector is entered to a shape motion compensation unit 125.

The shape motion compensation unit 125 generates a prediction shape picture, using the shape motion vector and the decoded shape picture of a shape decoder 126, as later explained, to send the generated prediction shape picture to the shape decoder 126. The shape decoder 126 decodes the codes from the demultiplexer 122 and the prediction shape picture to produce a decoded shape picture which is outputted. This decoded shape picture is sent both to a shape output terminal 127 and to the shape motion compensation unit 125.

The texture motion compensation unit 128 generates a prediction texture picture, using the texture motion vector and the decoded texture picture of a texture decoder 129, as later explained, and sends the generated prediction texture picture to the texture decoder 129. The texture decoder 129 decodes the code from the demultiplexer 122 and the prediction texture picture to produce a decoded texture picture which is outputted. This decoded texture picture is sent both to a texture output terminal 130 and to the texture motion compensation unit 128.

Although not shown, this decoded shape picture is used for synthesizing the decoded picture with the background picture, not shown, for producing a decoded reproduced picture.

With the above-described encoding method, in which, for encoding the shape motion vector, the difference between the shape motion vector of a given block and the texture motion vector of another block is encoded, the encoding efficiency is low in consideration of the encoding volume required for encoding the difference from the motion vector of the other block and the encoding volume required in encoding the difference of motion vectors of the different sorts of pictures, namely the shape and texture pictures.

Moreover, using the texture motion vector of the same block simply for encoding the shape motion vector is difficult except for the case of reversible shape encoding in consideration that a locally decoded shape picture is required in order to find the texture motion vector as described above. Moreover, the encoding efficiency cannot be increased in case of the reversible encoding, thus worsening the overall encoding efficiency.

In addition, the texture motion vector of the previous block is required in order to find the shape motion vector, and the locally decoded shape picture or decoded reproduced picture is required for encoding or decoding the texture, the relation of interdependence is complex thus complicating the control.

There is also a problem that if, when the amplitude of the texture picture is smaller than the texture noise amplitude, a motion vector with a small difference (residual) is selected, motion vectors with arbitrary directions are generated from block to block to produce a riotous state of the motion vectors to increase the code volume required in encoding the texture motion vector.

OBJECT AND SUMMARY OF THE INVENTION

It is therefore an object of the present invention to provide a digital moving picture encoding method and apparatus, a moving picture decoding method and apparatus and a recording medium which is free from the above-mentioned problems and which leads to the improved encoding efficiency.

In one aspect, the present invention provides a picture encoding apparatus in which a picture constituting a moving picture is divided into an object picture in which the main concern is a picture making up the moving picture and the other picture, the object picture is split into a texture picture representing brightness and color hue of the picture and a shape picture representing the shape of an object, the texture picture and the shape picture being encoded independently. The apparatus of the first aspect includes first motion vector detection means for detecting the motion vector of the shape picture and to output the motion vector of the shape picture, and first encoding means for encoding the shape picture based on the motion vector of the shape picture to output encoded data of the shape picture. The first encoding means also encodes the motion vector of the shape picture to output encoded data of the motion vector of the shape picture. The apparatus also includes second motion vector detection means for detecting the motion vector of the texture picture and for outputting the motion vector of the texture picture and second encoding means for encoding the texture picture based on the motion vector of the texture picture to output encoded data of the texture picture. The second encoding means also encodes the motion vector of the texture picture using the motion vector of the shape picture to output encoded data of the motion vector of the texture picture.

In another aspect, the present invention provides a picture decoding apparatus for decoding an encoded signal representing encoded moving picture signals, in which the encoded signal is made up of encoded data of a shape picture, encoded data of a motion vector of the shape picture, encoded data of a texture picture, and encoded data of a motion vector of the texture picture, and in which each of the encoded data is generated by dividing a picture constituting a moving picture into an object picture the main concern of which is a picture making up the moving picture and the other picture, splitting the object picture into a texture picture representing brightness and color hue of the picture and a shape picture representing the shape of an object, detecting the motion vector of the shape picture to output the motion vector of the shape picture, encoding the shape picture based on the motion vector of the shape picture to output encoded data of the shape picture, encoding the motion vector of the shape picture based on the motion vector of the texture picture to output encoded data of the motion vector of the shape picture, encoding the motion vector of the shape picture to output encoded data of the motion vector of the shape picture, detecting the motion vector of the texture picture to output the motion vector of the texture picture, encoding the texture picture based on the motion vector of the texture picture to output encoded data of the texture picture and by encoding the motion vector of the texture picture using the motion vector of the shape picture to output encoded data of the motion vector of the texture picture. The apparatus of the second aspect includes first decoding means for decoding encoded data of the motion vector of the shape picture to output a decoded motion vector of the shape picture and for decoding encoded data of the shape picture based on the decoded motion vector of the shape picture to output a decoded shape picture. The apparatus also includes second decoding means for decoding encoded data of the motion vector of the texture picture using the decoded motion vector of the shape picture to output a decoded motion vector of the texture picture and for decoding encoded data of the texture picture based on the decoded motion vector of the texture picture to output a decoded texture picture.

In a further aspect, the present invention provides a recording medium decodable by a decoding device, the recording medium having recorded thereon encoded signals representing encoded moving picture signals. The encoded signal is made up of encoded data of a shape picture, encoded data of a motion vector of the shape picture, encoded data of a texture picture, and encoded data of a motion vector of the texture picture. Each of the encoded data is generated by dividing a picture constituting a moving picture into an object picture in which the main concern is a picture making up the moving picture and the other picture, splitting the object picture into a texture picture representing brightness and color hue of the picture and a shape picture representing the shape of an object, detecting the motion vector of the shape picture to output the motion vector of the shape picture, encoding the shape picture based on the motion vector of the shape picture to output encoded data of the shape picture, encoding the motion vector of the shape picture based on the motion vector of the texture picture to output encoded data of the motion vector of the shape picture, encoding the motion vector of the shape picture to output encoded data of the motion vector of the shape picture, detecting the motion vector of the texture picture to output the motion vector of the texture picture, encoding the texture picture based on the motion vector of the texture picture to output encoded data of the texture picture and by encoding the motion vector of the texture picture using the motion vector of the shape picture to output encoded data of the motion vector of the texture picture.

According to the present invention, the encoding efficiency may be improved and the decoding control facilitated by encoding the motion vector of the shape picture and by encoding the motion vector of the texture picture by employing the motion vector of the shape picture.

Also, according to the present invention, the difference shape motion vector, which is a difference value between the shape motion vector and the shape motion vector of the previously encoded block, and the difference texture motion vector, which is a difference value between the texture motion vector and the shape motion vector of the same block, are encoded, so that the difference vector, which is a difference value from the different sorts of the vectors of the different blocks, is not encoded, thus improving the encoding efficiency and facilitating decoding control.

Also, according to the present invention, if the amplitude of the texture signal is smaller than the amplitude of the texture noise, the motion detection can be made using both the texture and the shape, thus improving the encoding efficiency and facilitating decoding control.

That is, according to the present invention, the shape is irreversibly encoded, while the motion vector of other blocks are referred to less frequently, thereby improving the encoding efficiency.

DESCRIPTION OF PREFERRED EMBODIMENTS

Figure 1:
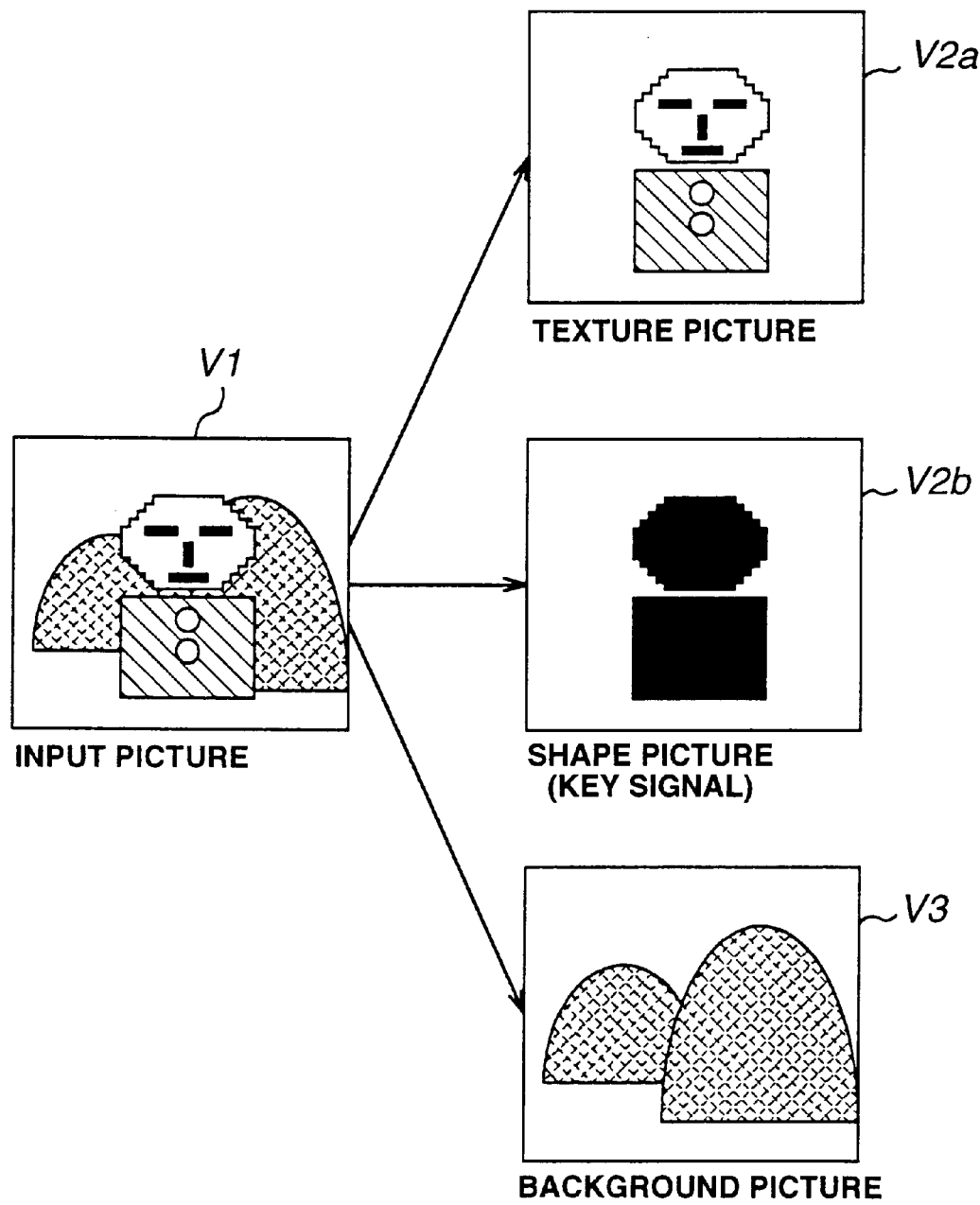
FIG. 1 illustrates the manner of dissolving a picture into objects.
Figure 2:
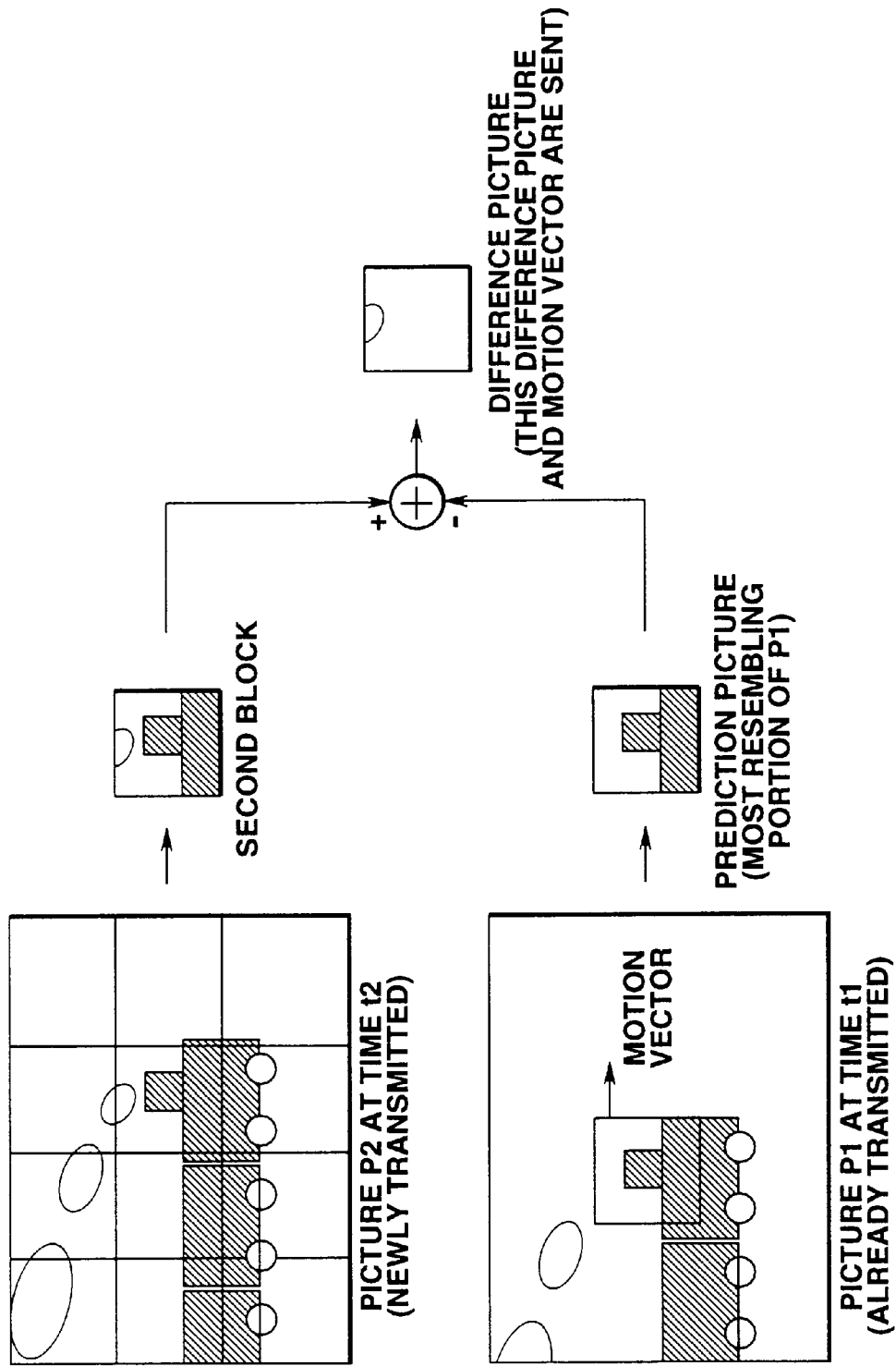
FIG. 2 illustrates the principle of motion compensated interframe prediction.
Figure 3:
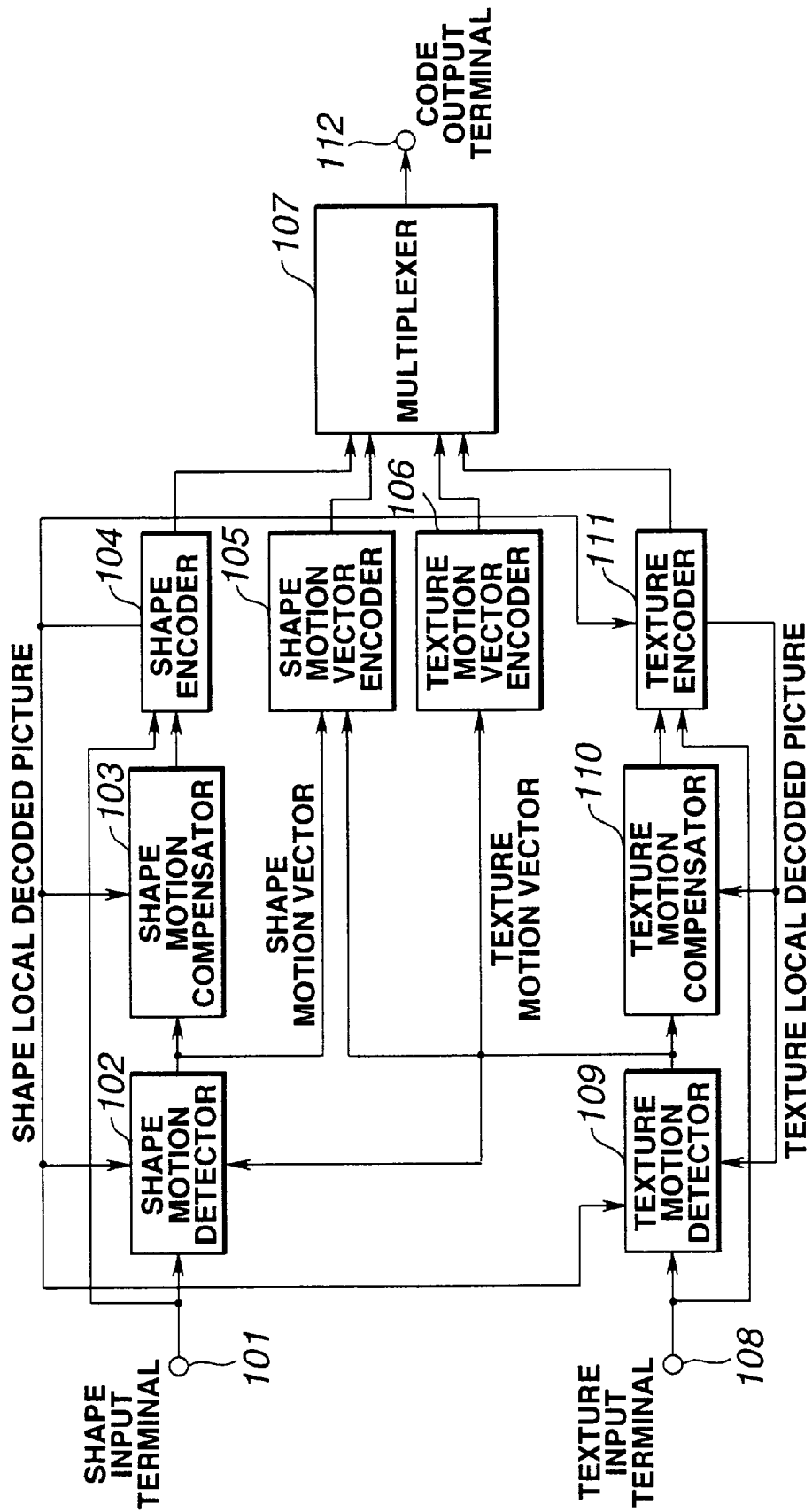
FIG. 3 is a schematic block circuit diagram showing the structure of a conventional moving picture encoding device.
Figure 4:
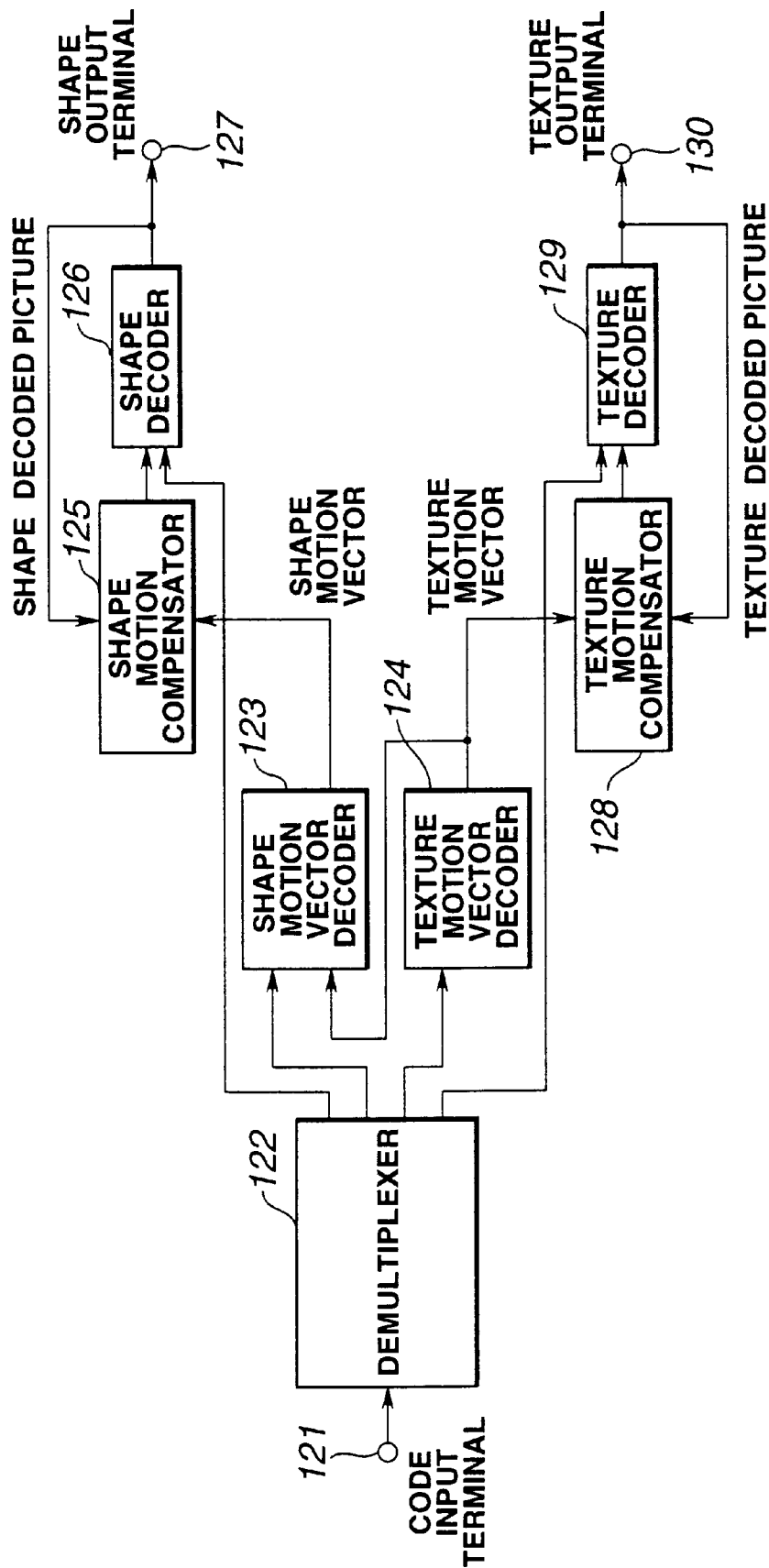
FIG. 4 is a schematic block circuit diagram showing the structure of a conventional moving picture decoding device.
Figure 5:
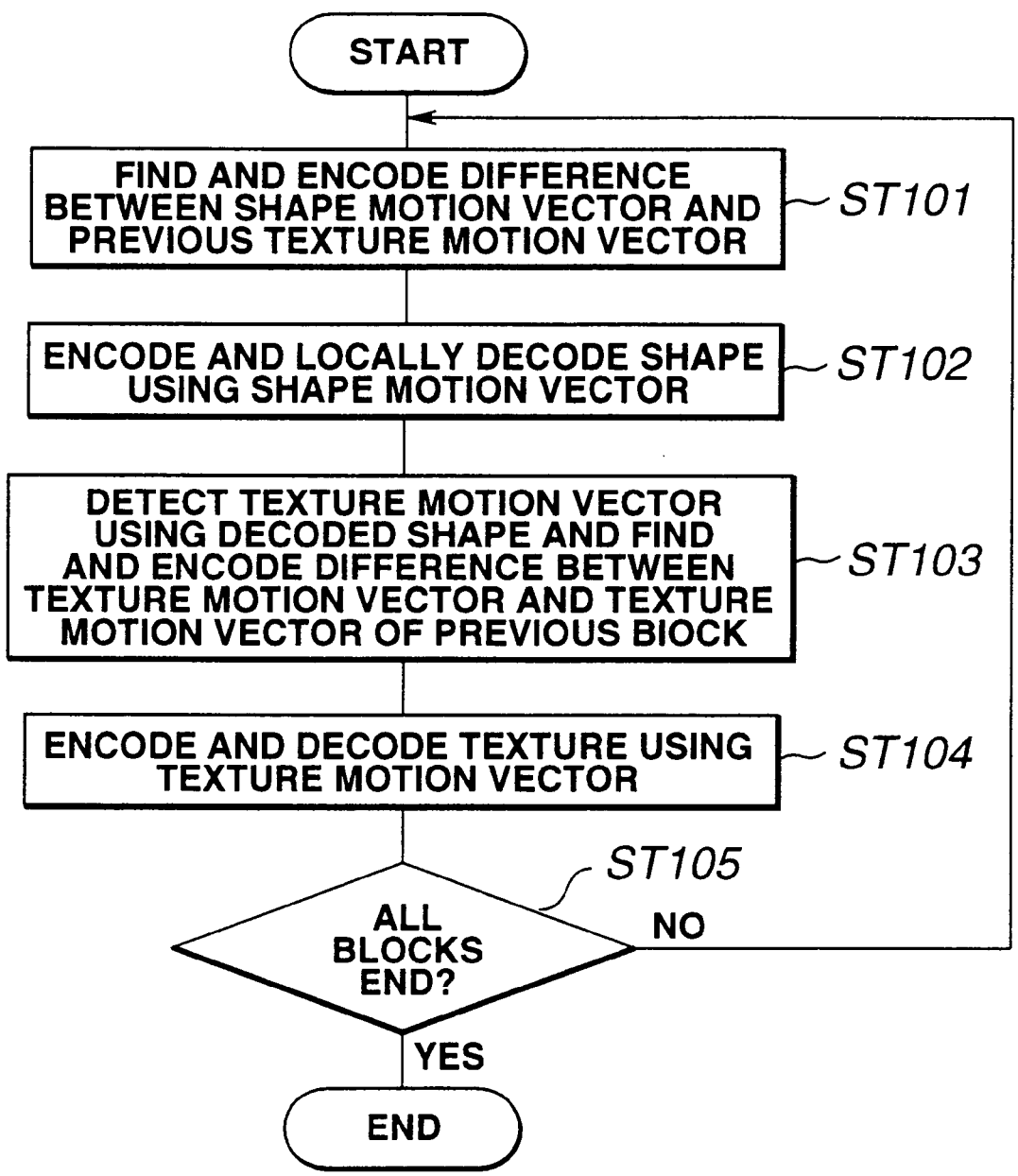
FIG. 5 is a flowchart for illustrating the sequence of encoding the shape and the texture in the conventional technique.
Figure 6:
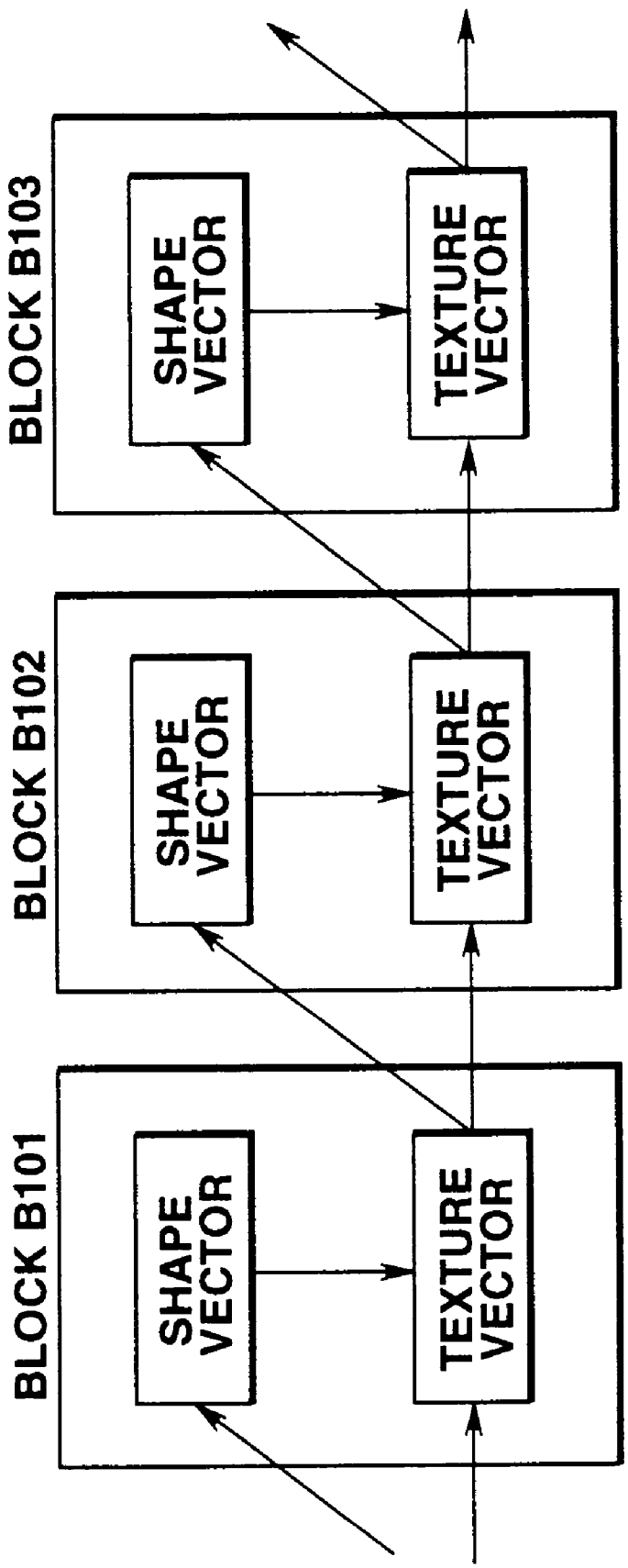
FIG. 6 illustrates the sequence of finding the shape motion vector and the texture motion vector in the conventional technique.

Referring to the drawings, preferred embodiments of the present invention will be explained in detail.

Figure 7:
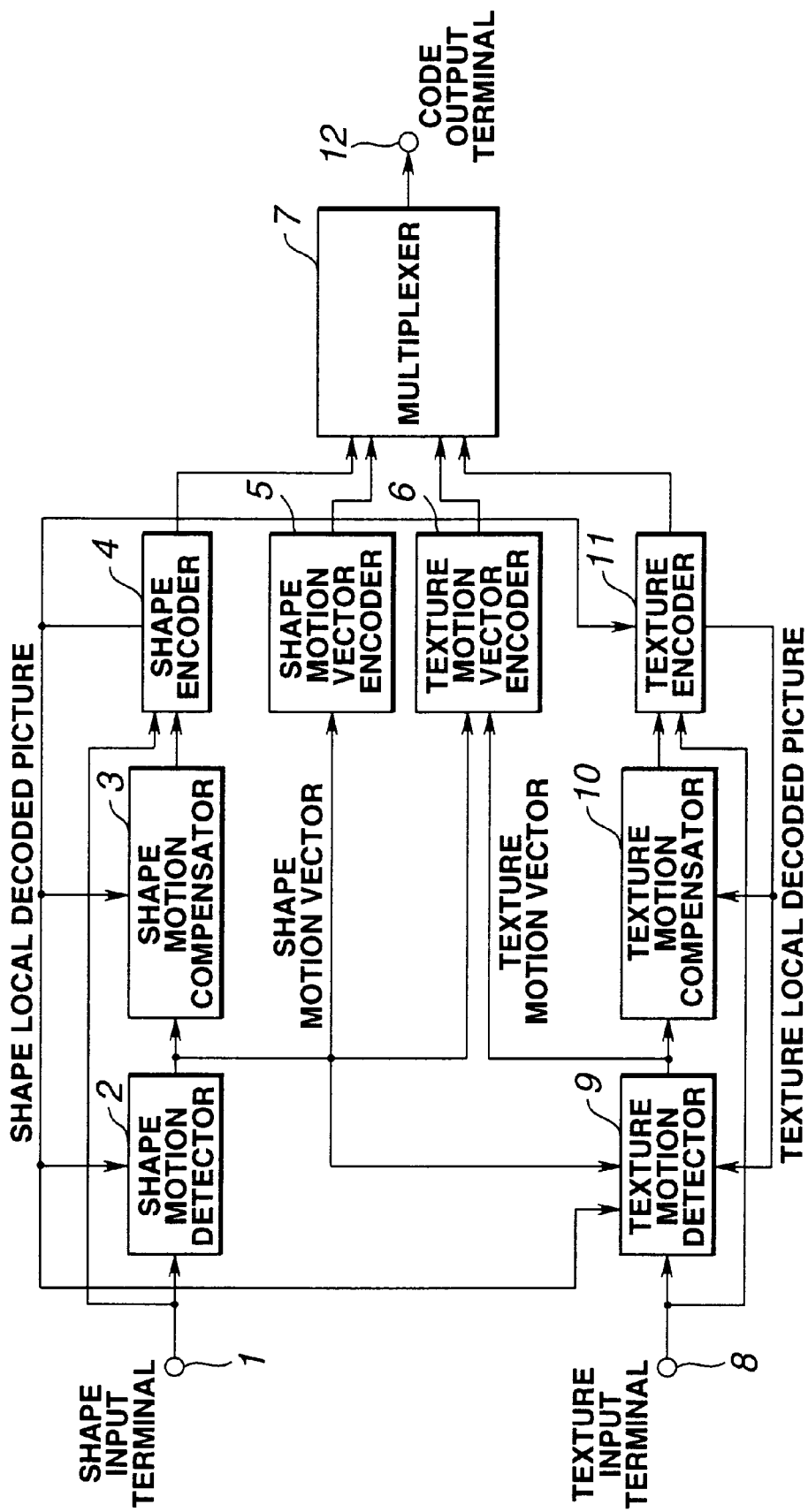
FIG. 7 is a schematic block circuit diagram showing the structure of a moving picture encoding device embodying the present invention.

For realization of the moving picture encoding method and device of the present invention, a moving picture encoding device shown in FIG. 7 encodes the shape and the texture. Specifically, the shape moving picture entering a shape input terminal 1 and a texture moving picture entering a texture input terminal 8 are encoded and the resulting encoded signal is outputted at a code output terminal 12.

The texture entering the texture input terminal 8 is sent to a texture motion detector 9 and to a texture encoder 11. The shape entering the shape input terminal 1 is sent to a shape motion detector 2 and to a shape encoder 4.

The shape motion detector 2 detects the amount of motion between the locally decoded shape picture, locally decoded by the shape encoder 4, as later explained, and the shape entering the shape input terminal 1, on the block basis, and outputs the shape motion vector on the block basis.

The shape motion vector, detected by the shape motion detector 2, is sent to a shape motion compensation unit 3 and to a shape motion vector encoder 5, for effecting shape encoding, while being sent to the texture motion detector 9 and to a texture motion vector encoder 6 for effecting texture encoding.

The shape motion compensation unit 3 generates a prediction shape picture from a locally decoded shape picture from the shape encoder 4, as later explained, using the shape motion vector, and sends the prediction shape picture to the shape encoder 4. The shape encoder 4 encodes the input shape, based on the prediction shape picture, from one block to another. The shape motion vector encoder 5 calculates the difference between the input shape motion vector and the shape motion vector of the previously encoded block to encode the difference shape motion vector.

On the other hand, the texture motion detector 9 searches the motion vector in the neighborhood of the shape motion vector as candidates for the texture motion vector in order to detect the texture motion vector. That is, a search range in which to detect the texture motion vector is set for the reference texture picture, with a position specified by the shape motion vector as the center, and the area inside the search range is searched for detecting the texture motion vector. The detected texture motion vector is entered to a texture motion vector encoder 6 and to a texture motion vector compensation unit 10. In detecting the texture motion vector, the locally decoded shape picture, as later explained, is used. That is, since the texture motion vector is detected on the block basis, the locally decoded shape picture is used and the operation of detecting the background portion is omitted, if a given block contains an edge between the human being and the background.

The texture motion vector encoder 10 encodes the texture motion vector. The texture motion vector compensation unit 10 generates a prediction texture picture from the locally decoded texture picture from the texture encoder 11, as later explained, using the texture motion vector, and sends the generated prediction texture picture to the texture encoder 11. The encoded texture is also locally decoded to produce a locally decoded texture picture which is sent to the texture motion detector 9 and to the texture motion compensation unit 10. The locally decided shape picture is sent to the texture encoder 11 so as to be used for encoding the texture. That is, the texture encoder 11 encodes the texture on the block basis. For example, if a block contains an edge between the human being and the background, and the texture in the block is encoded in this state, high frequency components are generated to render it impossible to encode the data efficiently. Therefore, in case of the block containing an edge, the processing of substituting the pixel of an edge portion of the human being for the pixel of the background picture is carried out using a locally decoded shape picture. The texture encoder 11 encodes the input texture, based on the prediction texture picture, from one block to another.

The texture motion vector encoder 6 calculates the difference between the input texture motion vector and the shape motion vector of the same block from the shape motion detector 2 to encode the difference texture motion vector.

Output codes of the shape encoder 4, shape motion vector encoder 5, texture motion vector encoder 6 and the texture encoder 11 are multiplexed by a multiplexer 7 so as to be outputted as an encoded signal at the code output terminal 12.

Although not shown, the encoded signal, outputted by the code output terminal 1 2, is subsequently added to with a pre-set error correction code and modulated in a pre-set manner. The modulated signals are then sent over transmission apparatus having various transmission rates, such as analog or digital telephone networks or dedicated data transmission networks, or are recorded on a storage medium having various recording capacities, such as a magneto-optical disc or a random access memories (RAMs) as picture signal recording mediums, and processed with pre-set demodulation and error correction, for later decoding by a moving picture decoding device, embodying the present invention, in a manner as will be explained subsequently.

Figure 8:
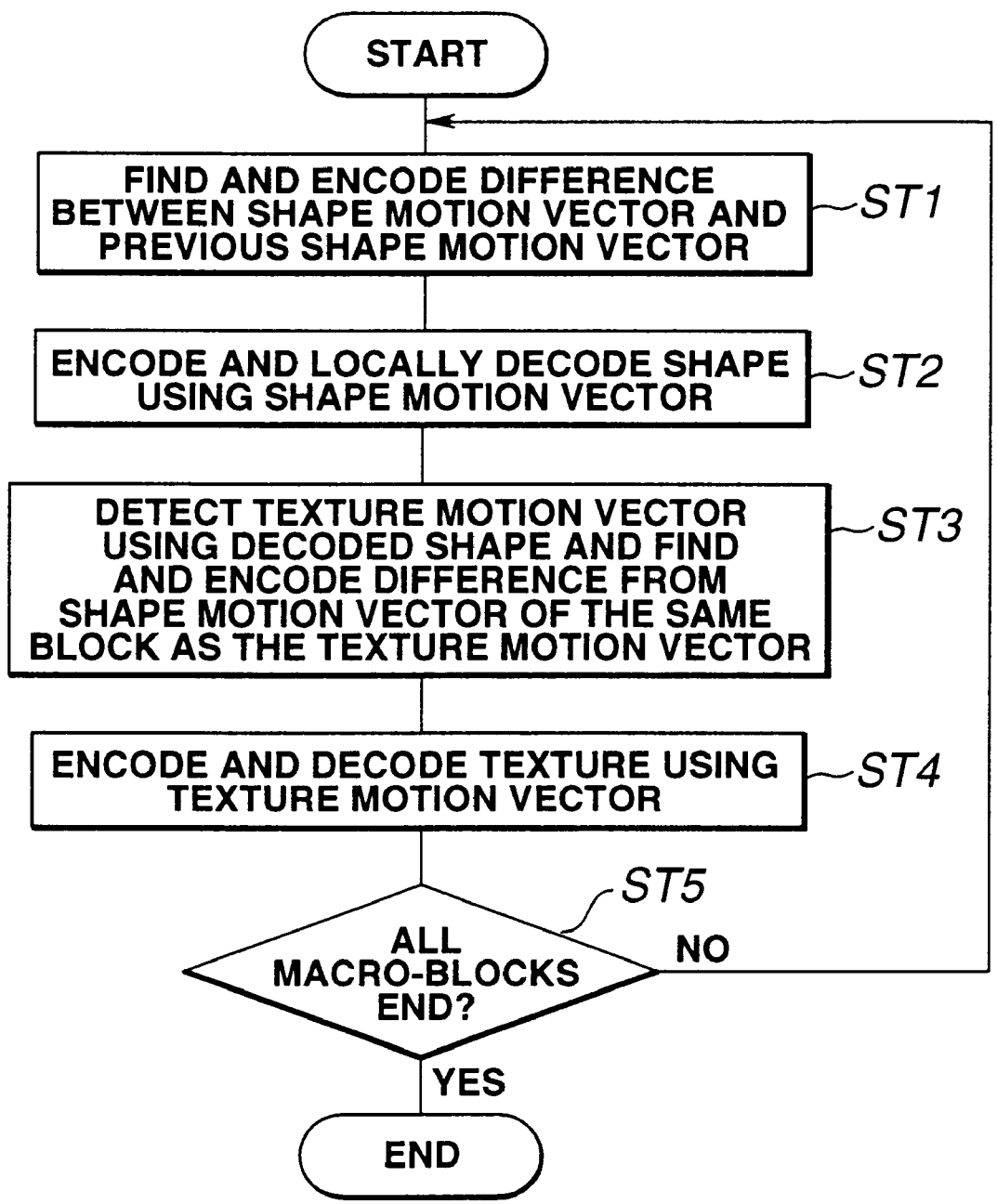
FIG. 8 is a flowchart for illustrating the sequence of encoding the shape and the texture embodying the present invention.

The time flow of encoding of the shape motion vector and the texture motion vector in the above-described embodiment is shown in FIG. 8. The processing of FIG. 8 is a repetition of the same processing from block to block. The particular processing in each block is as follows:

At step ST1, the shape motion vector of the left (forward) block is selected as the previously encoded shape motion vector, in a block for encoding, and the difference between the selected shape motion vector and the shape motion vector of the block for encoding is calculated and encoded.

At step ST2, the shape vector is used to perform shape encoding to generate shape codes which are then locally decoded to find the locally decoded shape picture.

At the next step ST3, the locally decoded shape picture is used to find the texture motion vector. The difference between the shape motion vector of the same block and the texture motion vector of the block for encoding is calculated and encoded.

Then, at step ST4, the texture motion vector is used to effect texture encoding. The resulting encoded texture then is locally decoded to find the locally decoded texture picture.

Finally, at step ST5, it is judged whether or not the processing for all of the macro-blocks has come to a close.

If the processing has not come to a close, processing reverts to step ST1 to repeat the above-mentioned operations and, if otherwise, the flow of the flowchart is terminated.

Figure 9:
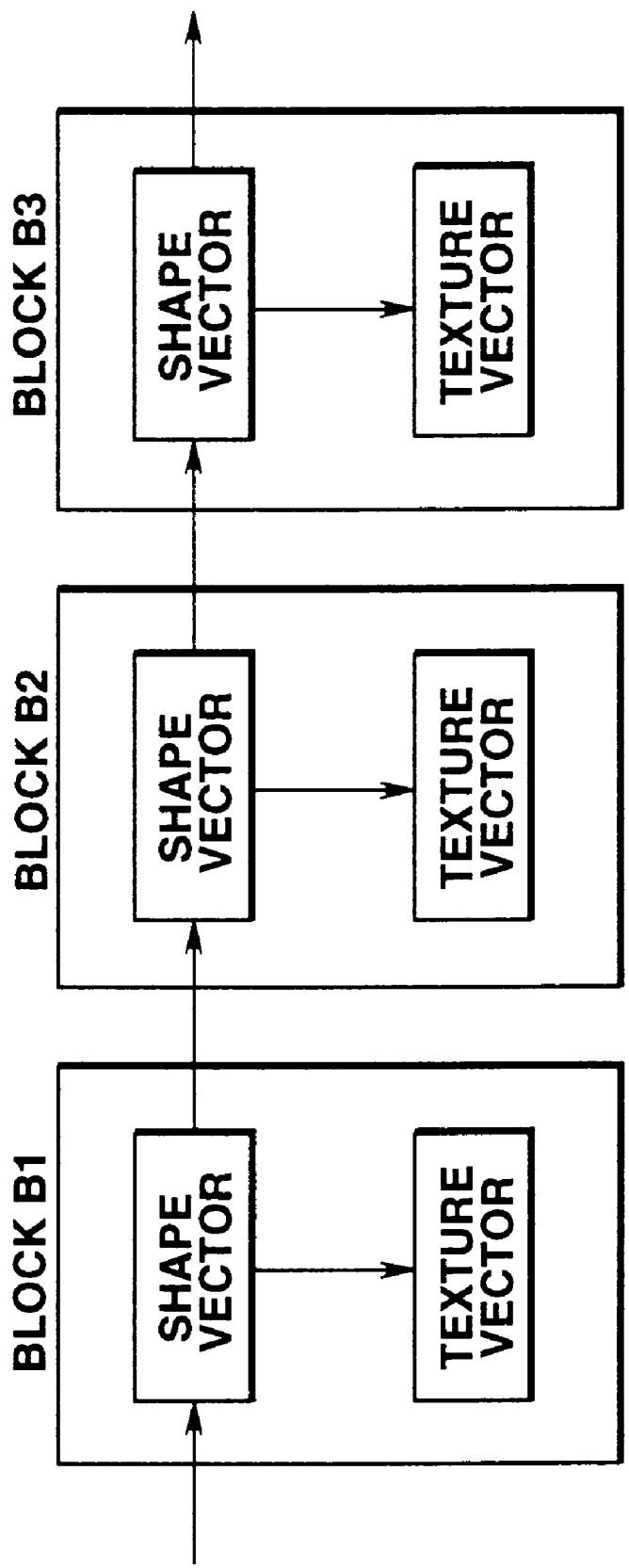
FIG. 9 illustrates the sequence of finding the shape motion vector and the texture motion vector embodying the present invention.

The relation of reciprocal pertinence between the texture motion vector and the shape motion vector is shown in FIG. 9, from which it is seen that respective left-side blocks of the blocks B1 to B3 are previous blocks, and the shape motion vector refers at all times in each of these blocks B1 to B3 to the left side (previous) shape motion vectors, while the texture motion vector refers at all times in each of these blocks B1 to B3 to the shape motion vector of the same block. The differences (residuals) from the referenced motion vector are encoded.

Figure 10:
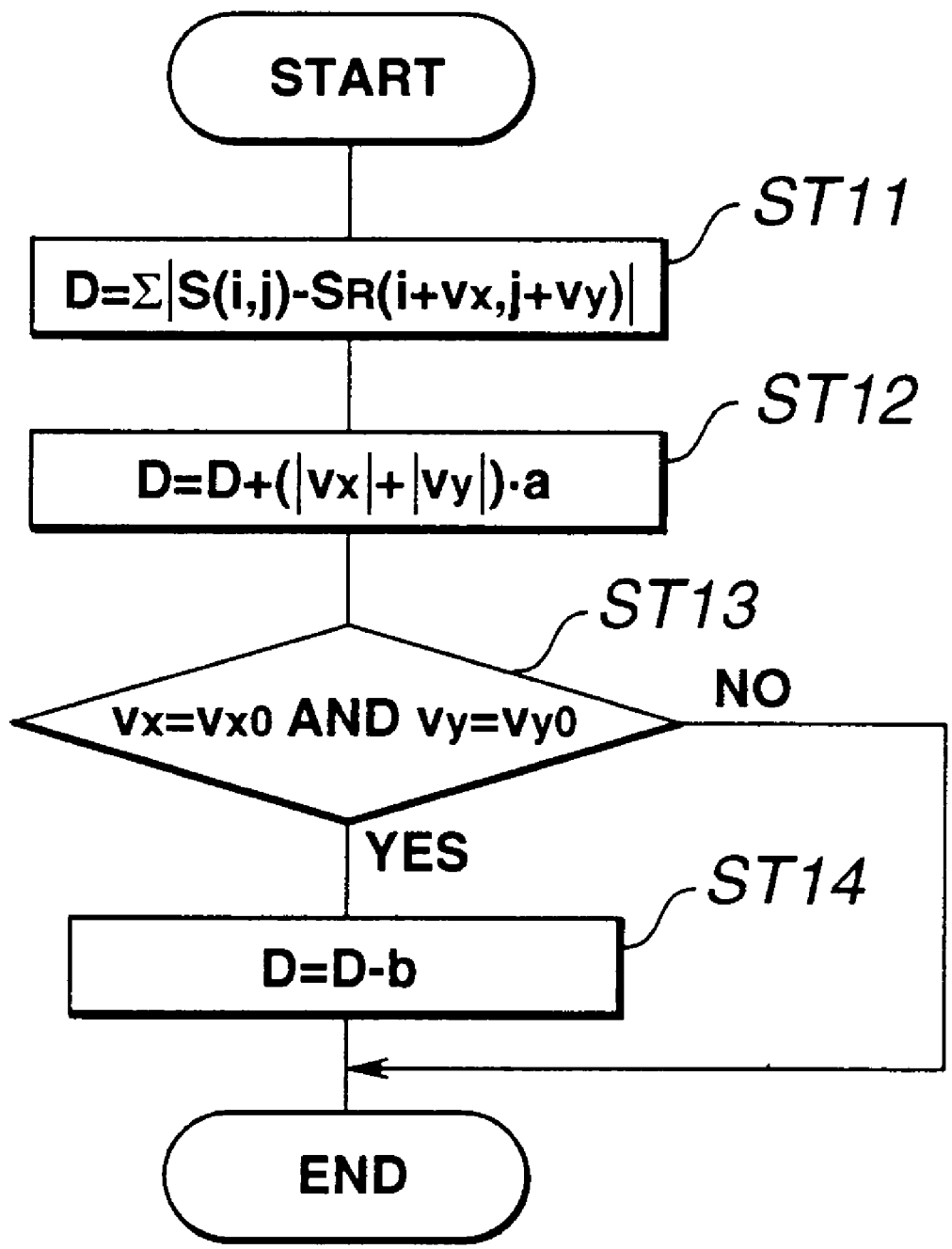
FIG. 10 is a flowchart for illustrating the sequence of calculating residuals in the shape motion detection embodying the present invention.

For finding the shape motion vector suited to the encoding, the shape motion detector 2 selects a shape motion vector associated with a position corresponding to the least value generated by calculations shown in the flowchart of FIG. 10. The operation of the shape motion detector 2 is hereinafter explained.

It is assumed that a shape motion vector candidate is $(V_x, V_y)$, the shape motion vector of a left side (previous) block is $(V_{xo}, V_{yo})$, $S(i,j)$ is a shape pixel in a block for encoding, and $S_R(i,j)$ is a shape pixel in a locally decoded block. First, at step ST11, the sum of absolute values (evaluated value D) of respective corresponding pixels between the block for encoding and the block in a search range of a locally decoded shape picture, as a reference picture, is found. Then, at step ST12, the length of the shape motion vector (sum of absolute values of $V_x$ and $V_y$) multiplied by a constant number α (usually, α= approximately ¼) is added to the evaluated value D as found at step ST11. The resulting value is an updated evaluated value D. Then, at step ST13, it is checked whether or not the shape motion vector for encoding is the same as the shape motion vector of the left side (previous) block. If the shape motion vector for encoding is the same as the shape motion vector of the left side block (YES), processing transfers to step ST14 where a constant b (usually of the order of 5) is subtracted from the evaluated value to give an updated new evaluation value D. If the result is NO, the current value is maintained.

The above-described sequence of operations is carried out for all blocks in the search range of the reference picture and the block for encoding to select the shape motion vector corresponding to the position minimizing the evaluation value.

Figure 11:
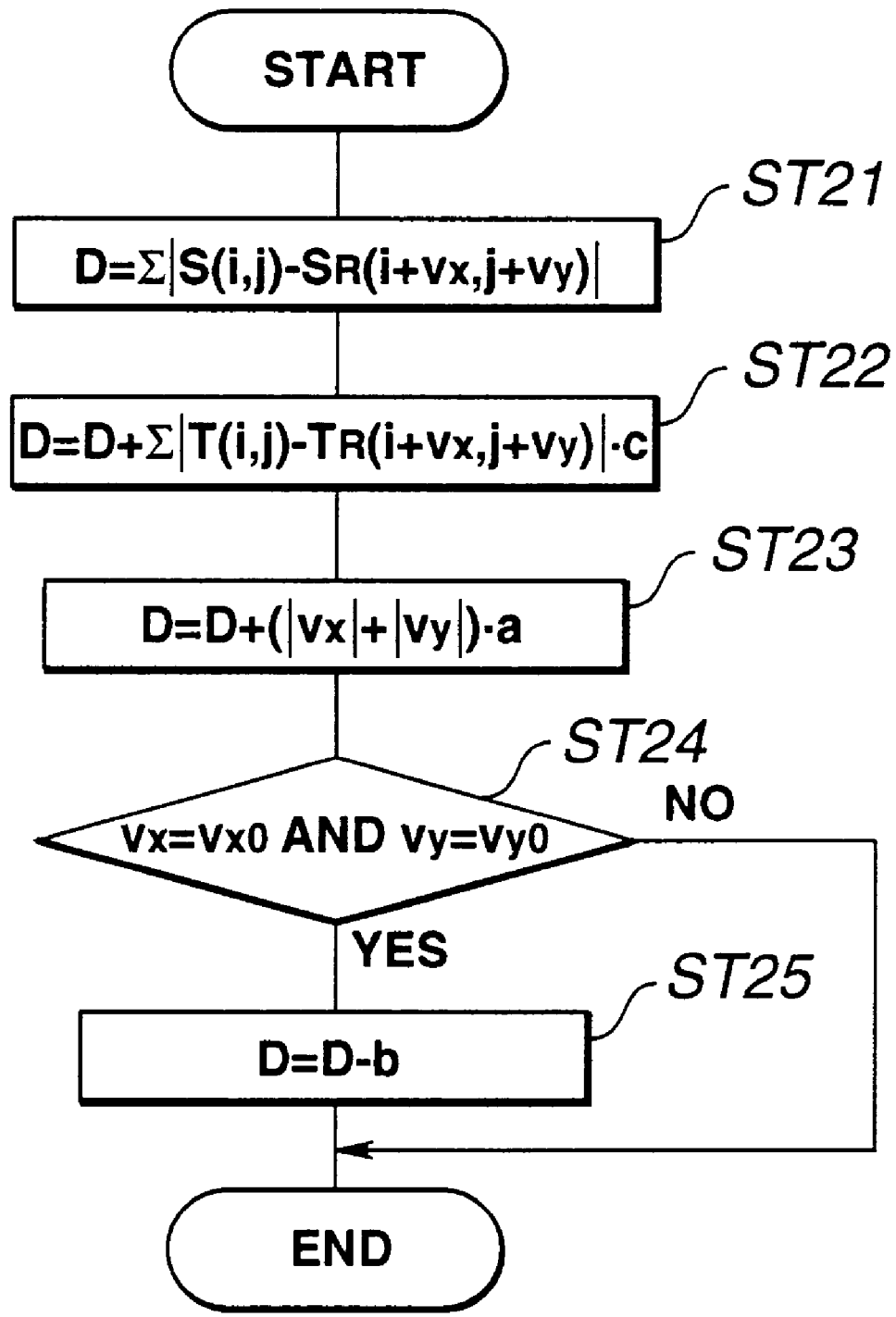
FIG. 11 is a flowchart for illustrating the sequence of calculating residuals with the aid of the texture in the shape motion detection embodying the present invention.

It may also be contemplated to have reference also to the information of the texture of the shape portion to set the vector corresponding to the position of the minimum value as calculated as in the flowchart of FIG. 11 as the shape motion vector.

Specifically, it is assumed that a candidate of the shape motion vector and the texture motion vector is $(V_x, V_y)$, the shape motion vector of the left side (previous) block is $(V_{xo}, V_{yo})$, $S(i,j)$ is a pixel of the shape in a block for encoding, $S_R(i,j)$ is a pixel of the shape in a locally decoded block, $T(i,j)$ is a pixel of the texture in the block for encoding and $T_R(i,j)$ is a pixel of the texture in a locally decoded block. Referring to the flowchart of FIG. 11, the sum of absolute values (evaluation value) of residuals of corresponding pixels between the shape block for encoding and the block in a search range of the locally decoded shape picture, which is a reference picture, is found. Then, processing transfers to step ST22 to find the sum of absolute values (evaluation value) of residuals of the corresponding pixels between the texture block for the shape block for encoding and the block in a search range of the locally decoded texture picture which is a reference picture corresponding to the shape search range. The value equal to a multiple equal to a constant c of the evaluation value of the texture is summed to the evaluation value of the shape as found at step ST21. The value c is usually 1/256 for the hard key and ½ for a soft key. The resulting sum is an updated new evaluation value D. Then, processing transfers to step ST13 where the length of the shape motion vector (sum of absolute values $V_x$, $V_y$) multiplied by a constant a (usually on the order of ¼) is summed to the evaluation value D as found at step ST22. The resulting value is an updated new evaluation value D. Then, processing transfers to step ST24 to check whether or not the vector of the shape for encoding is the motion vector of the shape of the left side (previous) block. If the result is YES, processing transfers to step ST25 where a constant b (usually of the order of 5) is subtracted and the resulting value is updated as a new evaluation value D. If the result is NO, the current value is kept. The above-described sequence of operations is carried out for all blocks in the search range of the reference picture and the block for encoding to select the shape motion vector corresponding to the position minimizing the evaluation value. The difference of the present embodiment from the embodiment of FIG. 10 is that the value corresponding to a multiple of the constant c of the residuals of the texture is summed the evaluation value of the shape as found at step ST21.

In encoding the shape motion vector and the texture motion vector of the current block in the above-described embodiment of the encoding device, the difference shape motion vector, which is the difference value from the motion vector of the shape of another previously encoded block is encoded for the shape motion vector, while a difference texture motion vector, as a difference from the shape motion vector of the same block, is encoded for the texture motion vector. That is, in the present embodiment of the moving picture encoding device, the difference vector from the different sorts of vectors in the different blocks is not encoded, thus giving an improved encoding efficiency.

As may be seen from the reciprocal pertinence of FIG. 9, the shape is not dependent on texture, although the texture is dependent on the shape. Thus, the shape by itself can be encoded first even failing the texture information. Also, encoding control can be facilitated with advantage.

Also, if the amplitude of the picture signals of the texture is smaller than the amplitude of the texture noise, motion detection can be performed using the texture and the shape simultaneously thus improving the encoding efficiency.

Figure 12:
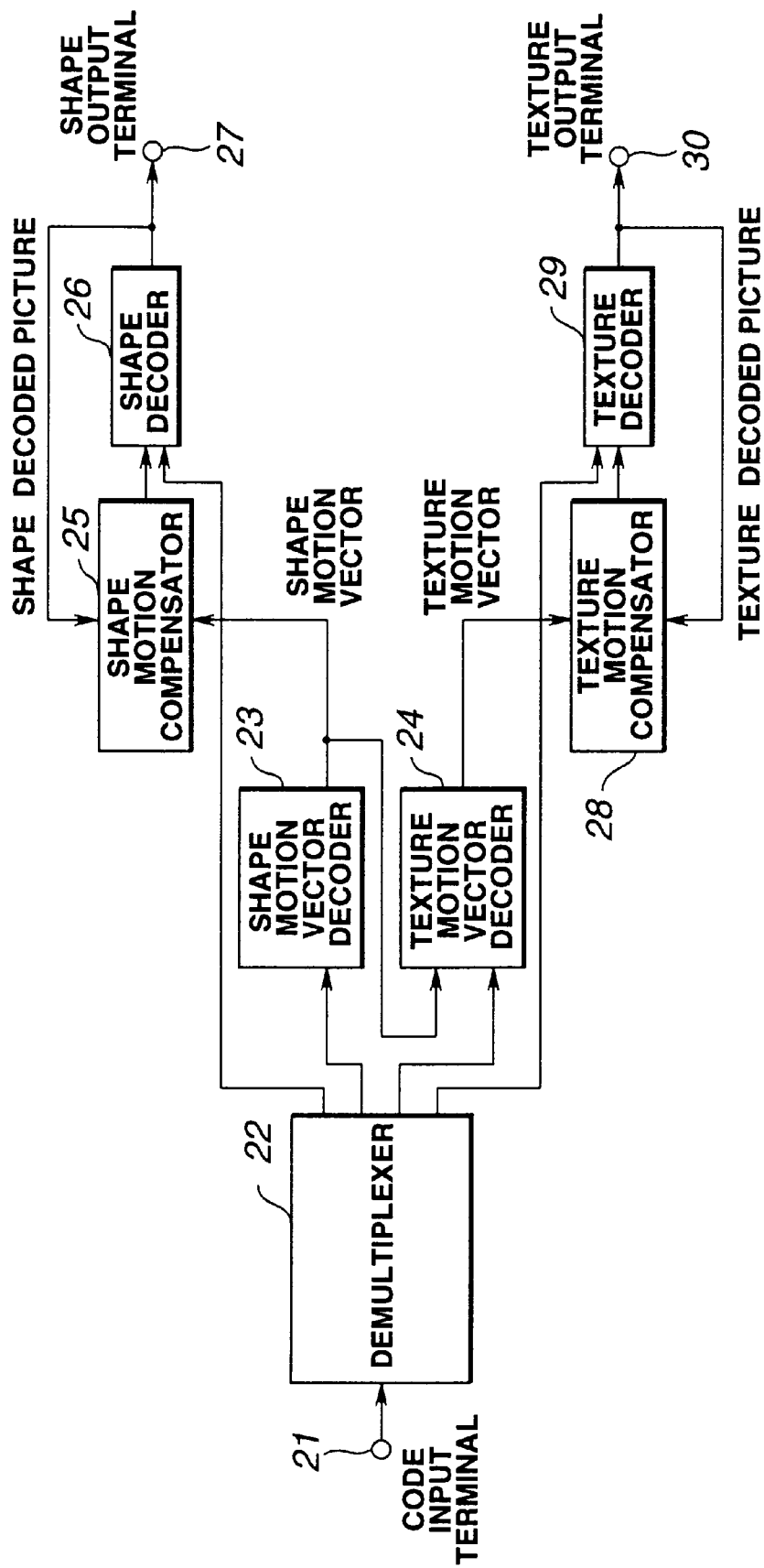
FIG. 12 is a schematic block circuit diagram showing the structure of a moving picture decoding device embodying the present invention.

Referring to FIG. 12, an embodiment for realization of the moving picture decoding method and apparatus according to the present invention will be hereinafter explained.

In the moving picture decoding device for the shape and the texture, shown in FIG. 12, the shape moving picture and the texture moving picture, decoded from the codes entering the code input terminal 21, are outputted at a shape output terminal 27 and at a texture output terminal 30, respectively.

Referring to FIG. 12, data entering the code input terminal 21, that is encoded data from the transmission network, received from a receiving device, not shown, or encoded data from a recording medium, obtained by a reproducing device, are separated by a demultiplexer 22 into codes of the shape, shape motion vector, texture and texture motion vector.

These separated codes are sent to associated units, that is a shape decoder 26, shape motion vector decoder 23, shape decoder 19 and to a texture motion vector decoder 24, for decoding. The shape motion vector decoder 23 decodes the input codes to generate a difference shape motion vector. The shape motion vector of the previously decoded block (shape motion vector of a block lying on the left side or front side of the block being decoded) is summed to the difference shape motion vector to decode the shape motion vector. This shape motion vector is sent to a shape motion compensation unit 25 and to a texture motion vector decoder 24.

The texture motion vector decoder 24 decodes input codes to generate a difference texture motion vector. The shape motion vector of the same block as that of the difference texture motion vector is summed to the difference shape motion vector to decode the texture motion vector. This texture motion vector is sent to a texture motion compensation unit 28.

The shape motion compensation unit 25 generates a prediction shape picture, using the shape motion vector and a decoded shape picture of a shape decoder 26 as later explained. The shape decoder 26 decodes codes from the demultiplexer 22 and the prediction shape picture to form a decoded shape picture which is outputted. This decoded shape picture is sent both to a shape output terminal 27 and to shape motion compensation unit 25.

The texture motion compensation unit 28 generates a prediction texture picture, using the texture motion vector and a decoded texture picture of a texture decoder 29 as later explained. The generated prediction texture picture is sent to the texture decoder 29. The texture decoder 29 decodes the codes from the demultiplexer 22 and the decoded texture picture from the prediction texture picture to output the resulting decoded texture picture. This decoded texture picture is supplied both the a texture output terminal 30 and to the texture motion compensation unit 28.

Although not shown, this decoded shape picture is subsequently used for synthesizing the decoded texture picture with the background picture, not shown, for generating a decoded reproduced picture.

Thus, in the decoding device of FIG. 12 of the present invention, similarly to the encoding device of FIG. 7 of the present invention, the manner of reciprocal pertinence of the motion vector is as shown in FIG. 9. Thus, there is no fear of reciprocal dependence of the shape and the texture to simplify decoding control.

Although encoding and decoding are performed on the block basis, this block can be adapted to various sizes of different blocks, such as 16×16 pixel macro-blocks as defined in MPEG2.

According to the present invention, as described above, the encoding efficiency may be improved and the decoding control facilitated by encoding the motion vector of the shape picture and by encoding the motion vector of the texture picture by employing the motion vector of the shape picture.

Also, according to the present invention, the difference shape motion vector, which is a difference value between the shape motion vector and the shape motion vector of the previously encoded block, and the difference texture motion vector, which is a difference value between the texture motion vector and the shape motion vector of the same block, are encoded, so that the difference vector, which is a difference value from the different sorts of the vectors of the different blocks, is not encoded, thus improving the encoding efficiency as well as facilitating decoding control.

Also, according to the present invention, if the amplitude of the texture signal is smaller than the amplitude of the texture noise, the motion detection can be made using both the texture and the shape, thus improving the encoding efficiency as well as facilitating decoding control.

That is, according to the present invention, the shape is irreversibly encoded, while the motion vector of other blocks are referred to less frequently, thereby improving the encoding efficiency.

It is to be noted that the present invention can be modified without departing from the scope thereof and that the embodiments given herein are for illustration sake only and are not intended for limiting the invention.

What is claimed is:

1. A picture encoding apparatus in which a picture constituting a moving picture is divided into an object picture in which the main concern is a picture making up the moving picture and the other picture, said object picture is split into a texture picture representing brightness and color hue of the picture and a shape picture representing the shape of an object, said texture picture and the shape picture being encoded independently, comprising:

first motion vector detection means for detecting the motion vector of the shape picture and to output the motion vector of the shape picture;

first encoding means for encoding said shape picture based on the motion vector of the shape picture to output encoded data of the shape picture, said first encoding means also encoding the motion vector of said shape picture to output encoded data of the motion vector of the shape picture;

second motion vector detection means for detecting the motion vector of the texture picture and for outputting the motion vector of the texture picture; and second encoding means for encoding said texture picture based on the motion vector of said texture picture to output encoded data of said texture picture, said second encoding means also encoding the motion vector of the texture picture using the motion vector of the shape picture to output encoded data of the motion vector of the texture picture.

2. The picture encoding apparatus as claimed in claim 1 wherein said first and second motion vector detection means detects each motion vector from block to block;

said first encoding means executing motion-compensated predictive coding using a locally decoded shape picture obtained on locally decoding encoded shape picture data to encode the difference shape motion vector obtained on calculating the difference between the motion vector of the shape picture of a block being encoded and the motion vector of the shape picture of a neighboring block;

said second encoding means executing motion-compensated predictive coding using a locally decoded texture picture obtained on locally decoding encoded texture picture data to encode the difference texture motion vector obtained on calculating the difference between the motion vector of the texture picture of a block being encoded and the motion vector of the shape picture of the same block.

3. The picture encoding apparatus as claimed in claim 2 wherein said second motion vector detection means searches a range in the vicinity of a position specified by a motion vector of said shape picture to detect the motion vector of said texture picture.

4. The picture encoding apparatus as claimed in claim 2 wherein said first motion vector detection means has calculating means for calculating the evaluation value to detect the motion vector of said shape picture; said calculating means including first calculating means for calculating the evaluation value to detect the motion vector of the shape picture using plural pixels in a block of said shape picture being encoded and plural pixels in a block of said locally decoded shape picture;

second calculating means for adding to said evaluation value a value taking into account the length of the motion vector of said shape picture to calculate a new evaluation value; and third calculating means for subtracting a pre-set value from said new evaluation value if the motion vector of said shape picture is of the same value as the motion vector of the shape picture of the neighboring block.

5. The picture encoding apparatus as claimed in claim 4 wherein said calculating means further includes fourth calculating means for calculating an evaluation value for detecting the motion vector of a texture picture using plural pixels in a block of the texture picture to be encoded and plural pixels in a block of said locally decoded texture pixel;

said second calculating means summing to said evaluation value a value which takes into account the length of the motion vector of the shape picture and said evaluation value for detecting the motion vector of said texture picture to calculate a new evaluation value.

6. A picture encoding method in which a picture constituting a moving picture is divided into an object picture in which the main concern is a picture making up the moving picture and the other picture, said object picture is split into a texture picture representing brightness and color hue of the picture and a shape picture representing the shape of an object, said texture picture and the shape picture being encoded independently, comprising:

a first motion vector detection step for detecting the motion vector of the shape picture and to output the motion vector of the shape picture;

a first encoding step for encoding said shape picture based on the motion vector of the shape picture to output encoded data of the shape picture, said first encoding step also encoding the motion vector of said shape picture to output encoded data of the motion vector of the shape picture;

a second motion vector detection step for detecting the motion vector of the texture picture and for outputting the motion vector of the texture picture; and a second encoding step for encoding said texture picture based on the motion vector of said texture picture to output encoded data of said texture picture, said second encoding means also encoding the motion vector of the texture picture using the motion vector of the shape picture to output encoded data of the motion vector of the texture picture.

7. The picture encoding method as claimed in claim 6 wherein said first and second motion vector detection steps detecting each motion vector from block to block;

said first encoding step executing motion-compensated predictive coding using a locally decoded shape picture obtained on locally decoding encoded shape picture data for encoding the difference shape motion vector obtained on calculating the difference between the motion vector of the shape picture of a block being encoded and the motion vector of the shape picture of a neighboring block;

said second encoding step executing motion-compensated predictive coding using a locally decoded texture picture obtained on locally decoding encoded texture data for encoding the difference texture motion vector obtained on calculating the difference between the motion vector of the texture picture of a block being encoded and the motion vector of the shape picture of the same block.

8. The picture encoding method as claimed in claim 7 wherein said second motion vector detection step searches a range in the vicinity of a position specified by a motion vector of said shape picture to detect the motion vector of said texture picture.

9. The picture encoding method as claimed in claim 7 wherein said first motion vector detection step has a calculating step for calculating the evaluation value for detecting the motion vector of said shape picture; said calculating step including a first calculating sub-step for calculating the evaluation value for detecting the motion vector of the shape picture using plural pixels in a block of said shape picture being encoded and plural pixels in a block of said locally decoded shape picture;

a second calculating sub-step for adding to said evaluation value a value taking into account the length of the motion vector of said shape picture to calculate a new evaluation value; and a third calculating sub-step for subtracting a pre-set value from said new evaluation value if the motion vector of said shape picture is of the same value as the motion vector of the shape picture of the neighboring block.

10. The picture encoding method as claimed in claim 9 wherein said calculating step further includes a fourth calculating sub-step for calculating an evaluation value for detecting the motion vector of a texture picture using plural pixels in a block of the texture picture to be encoded and plural pixels in a block of said locally decoded texture pixel;

said second calculating sub-step summing to said evaluation value a value which takes into account the length of the motion vector of the shape picture and said evaluation value for detecting the motion vector of said texture picture to calculate a new evaluation value.

11. A picture decoding apparatus for decoding an encoded signal representing encoded moving picture signals, in which the encoded signal is made up of encoded data of a shape picture, encoded data of a motion vector of the shape picture, encoded data of a texture picture, and encoded data of a motion vector of the texture picture, and in which each of said encoded data is generated by dividing a picture constituting a moving picture into an object picture in which the main concern is a picture making up the moving picture and the other picture, splitting said object picture into a texture picture representing brightness and the color hue of the picture and a shape picture representing the shape of an object, detecting the motion vector of the shape picture to output the motion vector of the shape picture, encoding said shape picture based on the motion vector of the shape picture to output encoded data of the shape picture, encoding the motion vector of said shape picture based on the motion vector of the shape picture to output encoded data of the motion vector of the shape picture, encoding the motion vector of the shape picture to output encoded data of the motion vector of the shape picture, detecting the motion vector of the texture picture to output the motion vector of the texture picture, encoding said texture picture based on the motion vector of the texture picture to output encoded data of the texture picture and by encoding the motion vector of the texture picture using the motion vector of said shape picture to output encoded data of the motion vector of said texture picture, said apparatus comprising:

first decoding means for decoding encoded data of the motion vector of the shape picture to output a decoded motion vector of the shape picture, said first decoding means also decoding encoded data of said shape picture based on the decoded motion vector of the shape picture to output a decoded shape picture; and second decoding means for decoding encoded data of the motion vector of the texture picture using the decoded motion vector of the shape picture to output a decoded motion vector of the texture picture, said second decoding means also decoding encoded data of said texture picture based on the decoded motion vector of the texture picture to output a decoded texture picture.

12. The picture decoding apparatus as claimed in claim 11 wherein the motion vector of said shape picture and the motion vector of said texture picture are each detected from block to block;

the encoded data of the motion vector of the shape picture being obtained by calculating a difference between the motion vector of the shape picture of a block to be encoded and the motion vector of the shape picture of the neighboring block and encoding the resulting difference shape motion vector;

the encoded data of the motion vector of the texture picture being obtained by calculating a difference between the motion vector of the texture picture of a block to be encoded and the motion vector of the shape picture of the same block and encoding the resulting difference shape motion vector;

said first decoding means executing motion compensated predictive decoding using said shape decoded picture and summing the motion vector of the difference texture of the block to be encoded to the motion vector of the shape picture of the neighboring block to restore the motion vector of the shape picture; and said second encoding means executing motion compensated predictive decoding using said texture decoded picture and summing the motion vector of the difference texture of the block to be encoded to the motion vector of the shape picture of the neighboring block to restore the motion vector of the texture picture.

13. A picture decoding method for decoding an encoded signal representing encoded moving picture signals, in which the encoded signal is made up of encoded data of a shape picture, encoded data of a motion vector of the shape picture, encoded data of a texture picture, and encoded data of a motion vector of the texture picture, and in which each of said encoded data is generated by dividing a picture constituting a moving picture into an object picture in which the main concern is a picture making up the moving picture and the other picture, splitting said object picture into a texture picture representing brightness and color hue of the picture and a shape picture representing the shape of an object, detecting the motion vector of the shape picture to output the motion vector of the shape picture, encoding said shape picture based on the motion vector of the shape picture to output encoded data of the shape picture, encoding the motion vector of the shape picture to output encoded data of the motion vector of the shape picture, detecting the motion vector of the texture picture using the motion vector of the shape picture to output the motion vector of the texture picture, encoding said texture picture based on the motion vector of the texture picture to output encoded data of the texture picture and by encoding the motion vector of the texture picture using the motion vector of said shape picture to output encoded data of the motion vector of said texture picture, said apparatus comprising:

- a first decoding step for decoding encoded data of the motion vector of the shape picture to output a decoded motion vector of the shape picture, said first decoding step also decoding encoded data of said shape picture based on the decoded motion vector of the shape picture to output a decoded shape picture; and
- a second decoding step for decoding encoded data of the motion vector of the texture picture using the decoded motion vector of the shape picture to output a decoded motion vector of the texture picture, said second decoding step also decoding encoded data of said texture picture based on the decoded motion vector of the texture picture to output a decoded texture picture.

14. The picture decoding method as claimed in claim 13 wherein

- the motion vector of said shape picture and the motion vector of said texture picture are each detected from block to block;
- the encoded data of the motion vector of the shape picture being obtained by calculating a difference between the motion vector of the shape picture of a block to be encoded and the motion vector of the shape picture of the neighboring block and encoding the resulting difference shape motion vector;
- the encoded data of the motion vector of the texture picture being obtained by calculating a difference between the motion vector of the texture picture of a block to be encoded and the motion vector of the shape picture of the same block and encoding the resulting difference shape motion vector;
- said first decoding step executing motion compensated predictive decoding using said shape decoded picture and summing the motion vector of the difference texture of the block to be encoded to the motion vector of the shape picture of the neighboring block to restore the motion vector of the shape picture; and
- said second encoding step executing motion compensated predictive decoding using said decoded texture picture and summing the motion vector of the difference texture of the block to be encoded to the motion vector of the shape picture of the same block to restore the motion vector of the texture picture.

15. A recording medium decodable by a decoding device, said recording medium having recorded thereon encoded signals representing encoded moving picture signals, the encoded signal is made up of encoded data of a shape picture, encoded data of a motion vector of the shape picture, encoded data of a texture picture, and encoded data of a motion vector of the texture picture, and in which each of said encoded data is generated by dividing a picture constituting a moving picture into an object picture in which the main concern is a picture making up the moving picture and the other picture, splitting said object picture into a texture picture representing brightness and color hue of the picture and a shape picture representing the shape of an object, detecting the motion vector of the shape picture to output the motion vector of the shape picture, encoding said shape picture based on the motion vector of the shape picture to output encoded data of the shape picture, encoding the motion vector of said shape picture to output encoded data of the motion vector of the shape picture, detecting the motion vector of the texture picture using the motion vector of the shape picture to output the motion vector of the texture picture, encoding said texture picture based on the motion vector of the texture picture to output encoded data of the texture picture and by encoding the motion vector of the texture picture using the motion vector of said shape picture to output encoded data of the motion vector of said texture picture.

16. The recording medium as claimed in claim 15 wherein

- the motion vector of said shape picture and the motion vector of said texture picture are each detected from block to block;
- the encoded data of the motion vector of the shape picture being obtained by calculating a difference between the motion vector of the shape picture of a block to be encoded and the motion vector of the shape picture of the neighboring block and encoding the resulting difference shape motion vector;
- the encoded data of the motion vector of the texture picture being obtained by calculating a difference between the motion vector of the texture picture of a block to be encoded and the motion vector of the shape picture of the same block and encoding the resulting difference shape motion vector.

* * * * *

UNITED STATES PATENT AND TRADEMARK OFFICE
CERTIFICATE OF CORRECTION

PATENT NO. : 5,978,034
DATED : Nov. 2, 1999
INVENTOR(S) : Kazuhisa Hosaka

It is certified that error appears in the above-identified patent and that said Letters Patent is hereby corrected as shown below:

ON THE TITLE PAGE:
Item [30]

Foreign Application Priority Data

Change "9-036764" to --9-036761--

Signed and Sealed this

Eighth Day of August, 2000

Attest:

Q. TODD DICKINSON

Attesting Officer

Director of Patents and Trademarks